Oct. 19, 1965 R. E. HURLEY 3,213,399

FLYBACK TRANSFORMERS

Filed July 17, 1962

INVENTOR.
ROBERT E. HURLEY
BY
W. H. Spouagle

United States Patent Office 3,213,399

Patented Oct. 19, 1965

3,213,399

FLYBACK TRANSFORMERS

Robert E. Hurley, Indianapolis, Ind., assignor to Radio Corporation of America, a corporation of Delaware Filed July 17, 1962, Ser. No. 210,322
6 Claims. (Cl. 336—212)

This invention relates to flyback transformers for television receivers and more particularly to improved magnetic core structures for such transformers.

In television receivers, utilizing electromagnetic deflection principles, it is customary to employ a flyback transformer in the horizontal deflection circuit thereof. The flyback transformer includes a low voltage primary coil, which is coupled to deliver deflection current to the horizontal deflection windings of the deflection yoke; and a high voltage secondary coil, which steps-up the flyback voltage pulses produced during the retrace portion of the scanning cycle to supply the operating potential for the ultor electrode of the picture tube.

In such transformers, a magnetic core made of a ferrite material is often employed. The core is assembled by juxtaposing two C-shaped core sections so that, when assembled, the composite core has a rectangular configuration with a window formed centrally therein. The primary coil of the transformer is wound around one leg of the composite core and the secondary coil is overwound around the primary coil.

The horizontal deflection circuitry of a typical television receiver consumes a significant amount of power, the amount being a substantial percentage of the total power consumed in the receiver. With the advent of picture tubes requiring wide angle electron beam deflection, the power demands of the horizontal deflection circuit has increased. To enable the horizontal deflection circuit to operate with moderate power requirements, it is important that the power losses in the circuit be reduced as much as possible.

One place where power losses occur in the horizontal deflection circuit is in the ferrite core of the flyback transformer. The reduction of core losses in a transformer in an existing horizontal deflection circuit would permit more power to become available for electron deflection in the picture tube.

Accordingly, it is an object of this invention to provide a new and improved flyback transformer.

It is another object of this invention to provide an improved ferrite core structure for a flyback transformer which exhibits reduced core losses.

An improved core structure for a flyback transformer comprises a pair of substantially C-shaped ferrite core sections. Each core section includes a body and a pair of arms which laterally extend from opposite ends of the body. Each core section is molded so that a first lateral arm thereof forms with the body right angular corners on both the inner and outer peripheries of the core section; while the second arm forms with the body a right angular corner on the outer periphery of the core section but an arcuate or fillet corner on the inner periphery thereof.

The core sections are juxtaposed so that the first and second arms of each core section are respectively aligned contiguous with each other to form a composite core structure. A low voltage primary coil is wound around the portion or leg of the composite core formed by the first arms of each core section. A high voltage secondary coil, having a plurality of turns, is overwound around the low voltage coil in a multilayered disc-like configuration. The outermost, or highest voltage, turn of the secondary coil is selected to be the center of curvature for the arcuate corners of the composite core structure. The radial distance from the outermost turn to the arcuate corners is chosen to establish a predetermined potential gradient between the coil and the core which is less than the breakdown potential gradient which causes arc-over.

The arcuate or fillet corners of the composite core structure increases the average cross sectional area of the core over that of a core with square inside corners, the same outside dimensions, and the same distance from the outer coil to the nearest point of the core. The increased cross sectional area reduces the flux density and the mean magnetic length of the core, thereby effecting a reduction in the power losses of the core. Consequently, more power is made available for electron deflection in the picture tube without increasing the danger of arc-over. Furthermore, this is accomplished without increasing the outer dimensions of the core or the cross sectional area of the transformer leg on which the primary and secondary coils are wound. Thus, the improved core structure may be utilized in existing horizontal deflection circuits without any redesign.

Therefore, it is a still further object of this invention to provide a ferrite core structure for a flyback transformer which exhibits less core losses than other prior cores of the same outer dimensions without increasing the danger of arc-over.

The novel features that are considered to be characteristic of this invention are set forth with particularity in the appended claims. The invention itself, however, both as to its organization and method of operation, as well as additional objects and advantages thereof, will best be understood from the following description when read in conjunction with the accompanying drawings in which:

Figure 1:
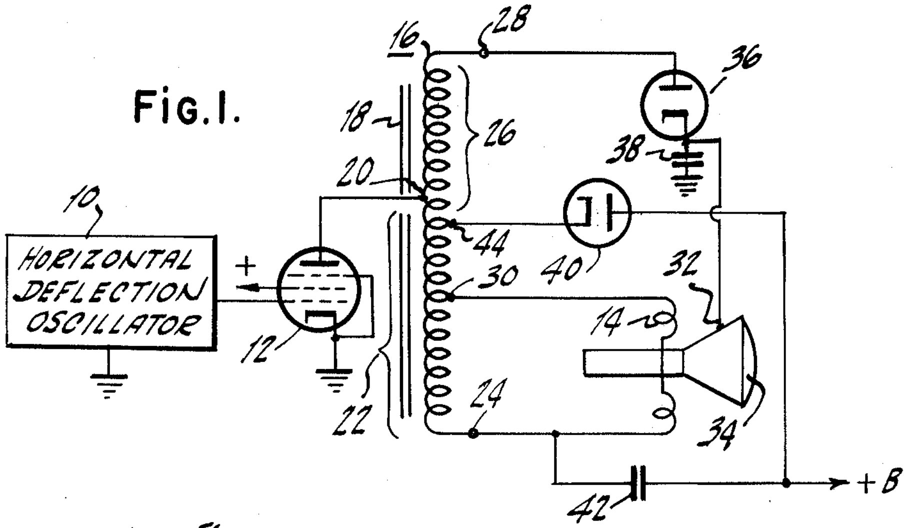
FIGURE 1 is a schematic circuit diagram of a portion of a television receiver including a horizontal deflection output circuit containing a flyback transformer embodying the invention.

Referring now to the drawings and particularly to FIGURE 1, a portion of the deflection circuitry of a typical television receiver is illustrated in schematic detail. The circuit includes a suitably synchronized horizontal deflection oscillator 10, the output of which is coupled to the control grid of a horizontal output tube 12. The output tube 12 supplies a current of suitable sawtooth waveform to the horizontal windings 14 of the deflection yoke through a flyback transformer 16 embodying the invention. The flyback transformer 16 includes a ferrite core 18 having a configuration to be described subsequently. The anode of the output tube 12 is connected to a terminal 20 of the transformer 14. The flyback transformer 16, which is shown connected as an autotransformer, includes a low voltage primary winding 22, defined by the terminals 20 and 24; and a high voltage secondary winding 26, defined by the terminals 20 and 28. The output tube 12 is effectively connected across the entire primary winding 22 of the transformer 16 while the horizontal deflection windings 14 are connected across a portion of the primary winding 22 defined by the terminals 24 and 30 thereof. These connections provide a step-down autotransformer type coupling between the driving tube 12 and the yoke windings 14 so as to provide an impedance match therebetween.

The sharp retrace stroke of sawtooth current waveform delivered to the horizontal deflection windings 14 is achieved by cut-off of the horizontal output tube 12 at the end of trace interval. Such cut-off causes a sudden collapse of the magnetic fields of the transformer 16 and the horizontal deflection windings 14. This sudden collapse of magnetic fields develops across the primary winding 22 of the flyback transformer 16 a flyback voltage pulse of a relatively high magnitude. In order to provide the high accelerating potential for the ultor electrode 32 of a picture tube 34, the amplitude of the periodically-developed flyback pulses may be stepped-up and then the pulses rectified before application to the ultor electrode. This is accomplished by connecting the secondary coil 26 to provide step-up autotransformer action and applying the stepped-up flyback pulses appearing at the high voltage terminal 28 of secondary coil 26 to the anode of a high voltage rectifier 36. The rectified output appearing at the cathode of the rectifier 36 is applied directly to the ultor electrode 32 of the picture tube 34. A filter capacitor 38 is coupled between the rectifier cathode and ground to smooth out the rectified ultor voltage.

A damper tube 40, which serves to damp the oscillations, produced in the transformer 16 by the cut-off of the output tube 12, after the first half cycle of oscillation, is coupled in series with a capacitor 42 across a portion of the primary coil 22 defined by the terminals 24 and 44. The damper tube 40 contributes a component to the sawtooth current flowing through the yoke windings 14 and in conjunction with the capacitor 42 serves to develop an augmented power supply or B-boost voltage.

Figure 2:
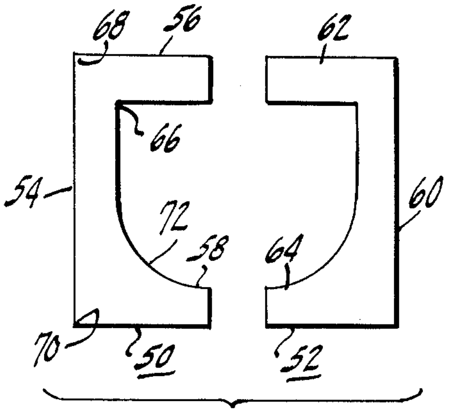
FIGURE 2 is a front view of the core sections, before assembly, of a flyback transformer embodying the invention.

The physical structure of a magnetic core for a flyback transformer which exhibits reduced core losses, as compared to a conventional core, is shown in FIGURE 2. The magnetic core embodying the invention includes a pair of substantially C-shaped core sections 50 and 52. The core sections 50 and 52 formed of a ferrite material and are molded to be substantially identical. The core section 50 includes a body 54 having first and second arms 56 and 58 respectively, laterally extending from opposite ends thereof. Similarly, the core section 52 also includes a body 60 having first and second arms 62 and 64 extending laterally therefrom. The first arm 56 of the core section 50 forms with the body 54 thereof, right angular or square corners 66 and 68 on both the inner and outer peripheries of the core section 50. The second arm 58 of the core section 50 forms a right angular or square corner 70 with the body 54, on the outer periphery of the core section 50 but an arcuate or deep-fillet corner 72 on the inner periphery thereof. Similarly the first arm 62 of the core section 52 forms right angular or square corners with the body 60 thereof while the second arm 64 forms a square corner on the outer periphery of the core section 60 but an arcuate corner on the inner periphery thereof. The substantially C-shaped core sections 50 and 52 are assembled with the first arms 56 and 62 and the second arms 58 and 64 of each core section aligned to be respectively contiguous with each other.

Figure 3:
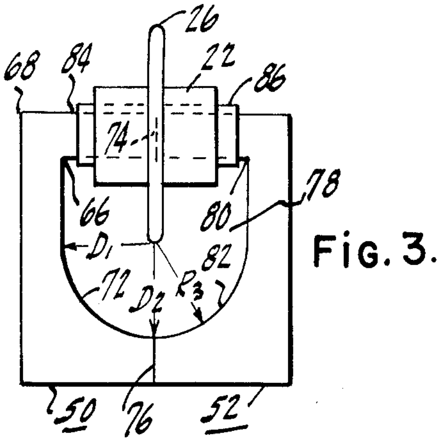
FIGURE 3 is a front view of an assembled flyback transformer embodying the invention.

When so combined, as shown in FIGURE 3, a cleavage or parting plane is formed at the junction of the core sections 50 and 52. A pair of air gaps 74 and 76 of a small and predetermined magnitude is formed at the junction of the sections 50 and 52 and prevents saturation of the core.

As assembled, the ferrite core of the flyback transformer has a substantially rectangular outer periphery or perimeter. The aperture or window 78 formed between the core sections 50 and 52 is non-rectangular in shape. The perimeter of the window 78, which is the inner periphery of the transformer core, includes a pair of square corners 66 and 80 and a pair of arcuate or deep-fillet corners 72 and 82 which combine to exhibit an inverted arch-like shape. Thus, one leg 84 of the transformer core, which is the leg formed by the first arms 56 and 62 of the core sections 50 and 52, has a prime cross sectional area which is less than the average cross sectional area of the other three legs of the transformer core.

The cross sectional area of the leg 84 may be selected to be the same as that of a conventional flyback transformer core leg so that a coil form 86, of a convention size, may be mounted thereon. The primary coil 22 of the flyback transformer is mounted on and surrounds the coil form 86 while the high voltage secondary coil 26 is overwound around the primary 22 with an insulating spacer (not shown) separating the two coils. The secondary coil 26 includes a plurality of turns which are wound in a multiplicity of layers so as to have the shape of an apertured disc. The disc-like configuration of the secondary coil 26 causes it to exhibit a stray or distributed capacitance to the ferrite core which is less than that which would be produced by a secondary coil wound in the form of a helix. Such a reduced stray capacitance reduces the undesirable effects of "raster ringing" caused by the distributed and leakage reactances of the flyback transformer resonating when shock excited by the flyback pulses to produce parasitic oscillations during the trace portion of the scanning cycle. It will, therefore, be appreciated that the shape and cross sectional area of the leg 84 of the transformer permits the mounting thereon of primary and secondary coils which have been designed to reduce such parasitic oscillations in the manner just mentioned.

In the usual method of designing flyback transformers, the cross sectional area of the legs of the core is first selected and then the shape of the disc-like secondary coil primarily determines the overall dimensions and the mean magnetic length of the core. The distance between the outermost or highest voltage turn of the secondary coil and the core (i.e. the distances $D_1$ and $D_2$ is selected to establish a desired potential gradient which is less than the breakdown potential gradient of the window so as to prevent arc-over. In flyback transformers, the breakdown potential gradient under usual operating conditions is on the order of 30 kilovolts per centimeter. The core is then designed to have a rectangular shaped window. With such a prior art design, the square corners opposite the core leg on which the secondary coil is wound are further away from the secondary coil than is actually needed to prevent arc-over.

In the flyback transformer core of FIGURE 3, a pair of arcuate or deep-fillet corners 72 and 82 are provided opposite the high voltage secondary coil 26 and the radius $R_3$ of the fillets 72 and 82 is selected to exhibit a desired potential gradient sufficiently low to prevent arc-over. The provision of the fillets 72 and 82 increases the cross sectional area of the core in the vicinity of the fillets and thus increases the average cross sectional area of the entire core. It is to be noted that the average cross sectional area of the core is increased without either increasing the overall dimensions of the core or the cross sectional area of the leg 84. Thus, the flyback transformer may be substituted in a conventional horizontal deflection circuit without redesigning the circuit. Furthermore, while it might be supposed that the square corners 66 and 80 could also be made arcuate, such a design would increase the danger of arc-over from the primary coil 22, since the primary coil approaches closely to these corners. While the peak amplitude of the flyback pulses in the primary coil 22 is only a fraction of that in the secondary coil 26, there are flyback transformers in some color television receivers which exhibit peak primary and secondary voltages on the order of 6 and 41 kilovolts respectively. Such a 6 kilovolt primary voltage may produce arc-over if precautions are not taken.

The provision of the fillets 72 and 82 increases the average cross sectional area of the core and decreases both the mean magnetic length and the flux density of the core. The $\mu Q$ product of a flyback transformer embodying the invention is thereby increased. The $\mu Q$ product of a ferrite transformer is a figure of merit for the transformer and the reciprocal of the $\mu Q$ product is a measure of the core losses of the transformer.

The power losses in a ferrite core transformer may be represented, in terms of the $\mu Q$ product, by the well-known Legg equation;

$$\frac{2\pi}{\mu Q}=ef+aB_m+c$$

where:

Q is the quality factor of a coil mounted on the core;
$\mu$ is the initial permeability of the ferrite core;
$e$, $a$ and $c$ are constants;
$f$ is the frequency of operation; and
$B_m$ is the maximum flux density of the core.

Figure 4:
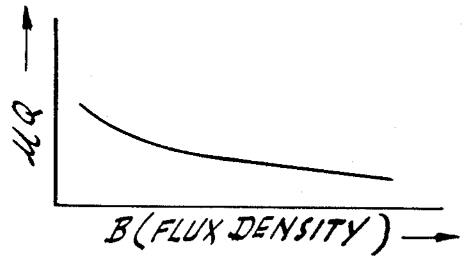
FIGURE 4 is a graph of $\mu$Q product versus flux density for a typical flyback transformer having a ferrite core.

As may be seen from this equation, as well as from FIGURE 4, the $\mu Q$ product is a function of flux density, which in turn is a function of cross sectional area. Thus, with all other conditions the same, the power losses in a ferrite core decrease with a decreased flux density. A more complete description of the losses in a magnetic ferrite core may be obtained from the book "Theory and Application of Ferrites," by Ronald F. Soohoo published in 1960 by Prentice Hall, Inc.

It will be appreciated that, while as a general statement the losses in the magnetic core tend to be decreased by increasing the cross sectional area of the core, other factors which also play an important part in the design of flyback transformers, can render the general statement inaccurate. For example, increasing the cross sectional area of all the legs of the core would also increase the diameters of the turns on both the low voltage primary and high voltage secondary windings. Such an increase in the diameter of the turns in these windings would increase the power loss in the copper of these windings and tend to counterbalance or overcome the gain achieved by the decrease in core losses. Additionally, as previously mentioned, the high frequency oscillations produced in the high voltage secondary coil during the trace portion of the scanning cycle are a function of the self-capacitance of the coil. If the diameter of the coil is increased such that the parasitic oscillations become excessive, the power loss introduced by such oscillations will also tend to counterbalance the gain achieved by the decrease in core losses. It is to be noted that the flyback transformer of FIGURE 3 increases the cross sectional areas of the core without increasing the diameter of the turns of the primary and secondary coils of the transformer and thus obviates the above problems.

Figure 5:
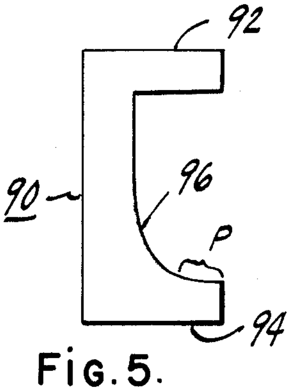
FIGURE 5 is a front view of a core section illustrating another embodiment of the invention.

Inasmuch as auxiliary windings, in addition to the primary and secondary coils, may also be included in flyback transformers, it might not be desirable in such cases to increase the cross sectional area of the portion of the transformer core on which the auxiliary windings are mounted over the dimensions of prior transformers. An embodiment of the invention which solves this problem is shown in FIGURE 5. A substantially C-shaped core section 90 having first and second lateral arms 92 and 94 includes one inner fillet corner 96 which increases the average cross sectional area of the core section 90. However, notwithstanding the fillet corner 96, a significant portion P of the second lateral arm 94 is formed with the same shape and cross sectional area as the first lateral arm 92. Thus, when the core section 90 is combined with an identical core section, the leg of the transformer formed by the second lateral arms 94 will have these portions exhibiting the same cross sectional area and shape as a prior art transformer. The auxiliary windings of the flyback transformer may therefore be mounted on these portions without redesigning the circuit.

Thus, a flyback transformer disclosed herein includes a ferrite core structure having three legs which exhibit an average cross sectional area greater than the remaining leg of the core. The primary and secondary coils of the transformer are mounted on the said remaining leg of the core. The increase in cross sectional area of three legs of the transformer is occasioned by providing a pair of deep-fillet or arcuate corners in the window of the transformer. The radial distance from the high voltage coil to the arcuate corners is selected to effect a predetermined potential gradient so as to prevent arc-over therebetween.

What is claimed is:

1. A flyback transformer comprising in combination:
a pair of substantially C-shaped ferrite core sections;
each of said core sections including a body having first and second arms laterally extending from opposite ends thereof;
said first arm of each core section forming with said body substantially square corners on both the outer and inner peripheries of said core sections;
said second arm of each core section forming with said body a substantially square corner on the outer periphery of said core section and an arcuate corner on the inner periphery thereof and dimensioned so as to provide each core section with an average cross sectional area exceeding the cross sectional area of said first arm;
said core sections being juxtaposed so that the first and second arms of each core section are respectively aligned contiguous with each other to form an apertured composite core structure;
a low voltage primary coil wound around a leg of said composite core formed by the said first arms of each core section; and
a high voltage secondary coil having a plurality of turns and overwound in a multilayered disc-like configuration around said low voltage coil,
the radial distance from the outermost turn of said high voltage secondary coil to the arcuate corners of said composite core structure constituting the minimum distance between said outermost turn and any portion of said composite core structure.

2. A flyback transformer comprising in combination:
a bi-part magnetic core including a pair of substantially C-shaped ferrite core sections juxtaposed to form a composite core having a plurality of legs and exhibiting a substantially rectangular outer periphery;
said core sections molded to form therebetween a window having a pair of substantially square corners and a pair of arcuate corners;
a low voltage coil wound around the leg of said composite core defined by said square corners; and
a high voltage coil having a plurality of turns and overwound in a multilayered disc configuration around said low voltage coil,
the radial distance from the outermost turn of said high voltage coil to the arcuate corners of said window being the least spacing between said composite core and said outermost turn and selected to establish a predetermined potential gradient less than the breakdown potential gradient of the air space therebetween.

3. A flyback transformer comprising in combination:
a pair of substantially C-shaped ferrite core sections;
each of said sections including a body and first and second arms laterally extending from opposite ends of said body;
said first arm of each core section forming substantially square inner and outer corners with said body;
said second arm of each core section forming an outer square corner and an inner fillet corner with said body;
the cross sectional area of each core section adjacent said fillet corner being greater than that adjacent said square corner;
said core sections being juxtaposed with said first and second arms respectively aligned contiguous with each other to form an apertured composite core structure having a plurality of legs;

a coil form mounted on and surrounding the leg of said composite core structure formed by said first arms of each core section;

a low voltage primary coil wound around said coil form; and a high voltage secondary coil having a plurality of turns and overwound in a disc-like multilayered configuration around said low voltage coil, the center of curvature for said fillet corners falling in a spatial region intersected by the outer extremity of said high voltage secondary coil, and the maximum potential gradient in said transformer being established between said outer extremity of said high voltage secondary coil and said fillet corners.

4. A flyback transformer comprising in combination:

a pair of substantially C-shaped ferrite core sections juxtaposed to form a composite core having a plurality of legs and exhibiting a substantially rectangular shaped outer periphery;

said core sections exhibiting an inner periphery which includes a pair of right angle corners joined on one side by straight line extensions thereof, and on the other side by an arc;

the portion of said composite core defined by said arc exhibiting a greater average cross sectional area than the portion defined by the straight line extensions of said right angle corners;

a low voltage primary coil wound around the portion of said composite core defined by the straight line extensions of said right angle corners; and a high voltage coil having a plurality of turns and overwound in a multilayered disc-like configuration around said low voltage coil, the center of curvature of said arc corresponding to a point on the outermost turn of said high voltage coil, and the dimensions of said coils and said core sections being so related as to render the radial distance from the outermost turn of said high voltage coil to said arc determinative of said transformer's maximum potential gradient.

5. In a flyback transformer, a core structure comprising:

a pair of substantially C-shaped ferrite sections juxtaposed to form a composite core structure having a plurality of legs and exhibiting a substantially rectangular outer periphery; and said ferrite sections being formed to define therebetween a window having a pair of substantially square adjacent corners and a pair of arcuate adjacent corners, the leg of said composite core structure defined by said square corners supporting a high voltage coil with the highest potential winding of said coil appearing at the outer periphery thereof, said outer periphery of said coil traversing a generally centrally disposed region of said window but more closely approaching said arcuate corners than any other portion of said composite core structure.

6. In a flyback transformer, a core structure comprising:

a pair of substantially C-shaped ferrite sections;

each of said sections including a body having first and second arms laterally extending from opposite ends thereof;

said first arm of each core section forming with said body substantially square corners on both the outer and inner periphery of said core sections:

said second arm of each core section forming with said body a substantially square corner on the outer periphery of said section and an arcuate corner on the inner periphery of said section and dimensioned so as to provide each core section with an average cross sectional area exceeding the cross sectional area of said first arm; and said core sections being juxtaposed so that the first and second arms of each core section are in alignment respectively contiguous with each other to form an apertured composite core structure, said first core section arms forming a leg of said core structure supporting a high voltage coil, the center of curvature of said arcuate corners falling at a point on the outer periphery of said high voltage coil.

References Cited by the Examiner

UNITED STATES PATENTS

| | | | |
|---|---|---|---|
| 1,555,066 | 9/25 | Lines | 336—233 X |
| 1,875,590 | 9/32 | Green | 336—233 X |
| 2,933,565 | 4/60 | Neumann | 336—233 X |
| 2,956,250 | 10/60 | Harse | 336—210 X |

JOHN F. BURNS, *Primary Examiner.*